United States Patent [19]

Dickhart, III

[11] 4,444,122
[45] Apr. 24, 1984

[54] PRIMARY SUSPENSION SYSTEM FOR A RAILWAY CAR

[75] Inventor: William W. Dickhart, III, Fort Washington, Pa.

[73] Assignee: The Budd Company, Troy, Mich.

[21] Appl. No.: 296,796

[22] Filed: Aug. 27, 1981

[51] Int. Cl.³ .............................................. B61F 5/30
[52] U.S. Cl. ............................. 105/224.1; 105/224 R; 267/3; 267/153
[58] Field of Search ............ 105/224.1, 182 R, 218 R, 105/222, 224 R; 308/38; 267/153, 3

[56] References Cited

U.S. PATENT DOCUMENTS

| | | | |
|---|---|---|---|
| 1,763,982 | 6/1930 | O'Brien | 105/224.1 |
| 2,009,059 | 7/1935 | Brennan et al. | 105/224.1 |
| 3,103,348 | 9/1963 | Paulsen | 267/153 |
| 3,191,896 | 6/1965 | Nathan | 267/153 X |
| 3,402,924 | 9/1968 | Rix | 267/153 X |
| 3,638,582 | 2/1972 | Beebe | 105/224.1 X |
| 4,044,689 | 8/1977 | Eggert, Jr. | 105/224.1 X |
| 4,111,406 | 9/1978 | Zanow | 267/153 |
| 4,237,791 | 12/1980 | Jackson et al. | 105/224.1 X |

Primary Examiner—Randolph Reese
Attorney, Agent, or Firm—Edward M. Farrell; Herman Foster; Thomas I. Davenport

[57] ABSTRACT

A primary suspension system is disposed between a journal bearing assembly carrying a wheel-axle assembly and a side frame of a railway truck. A rubber ring having cut-away portions or openings therein is bonded to inner and outer split metal rings. The inner ring is retained by the journal assembly and the outer ring is retained by the side frame.

9 Claims, 10 Drawing Figures

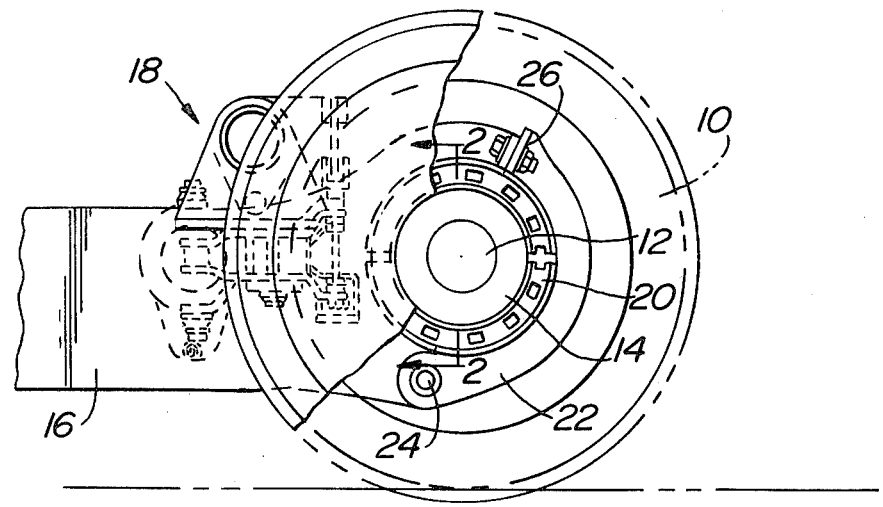
FIG. 1
FIG. 2
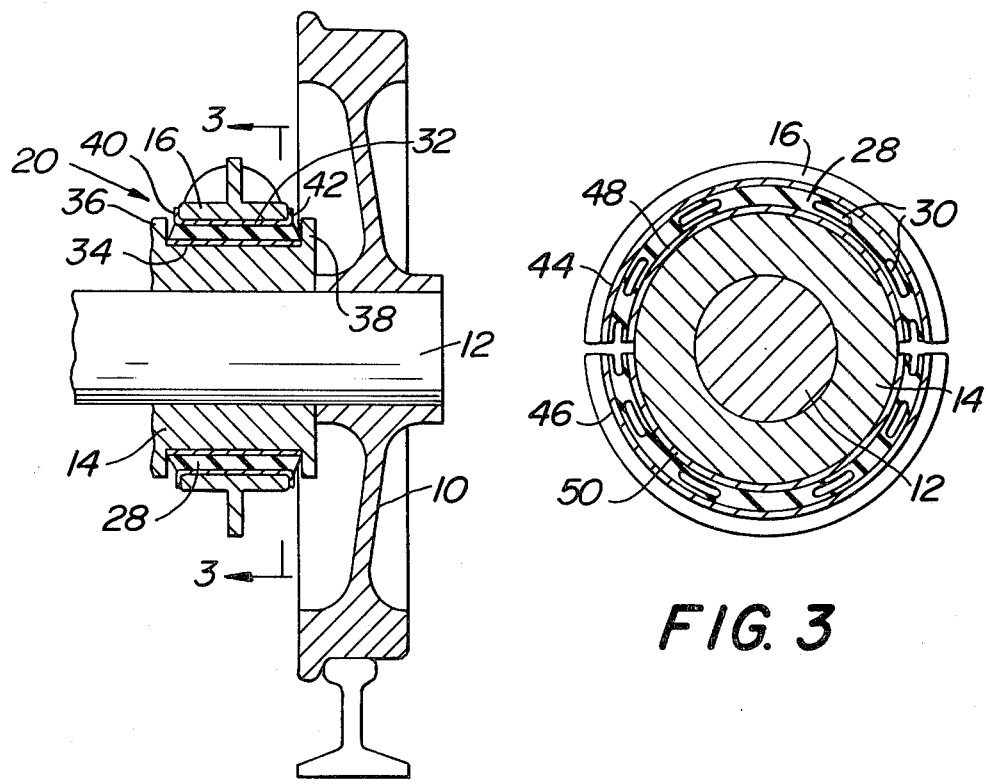
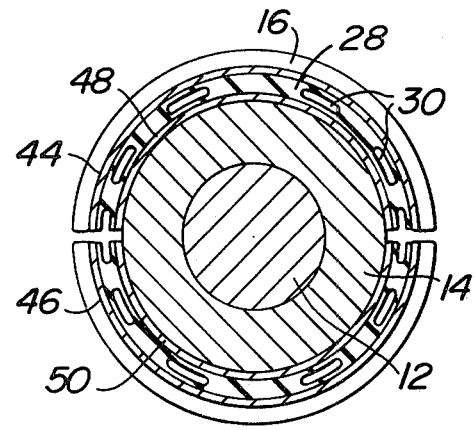
FIG. 3

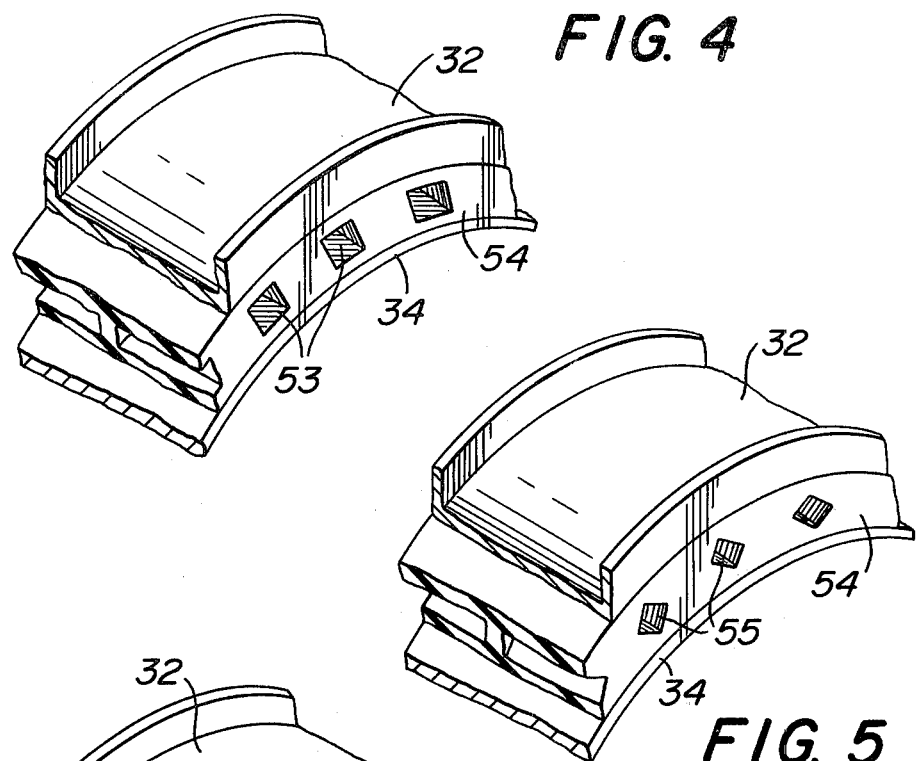
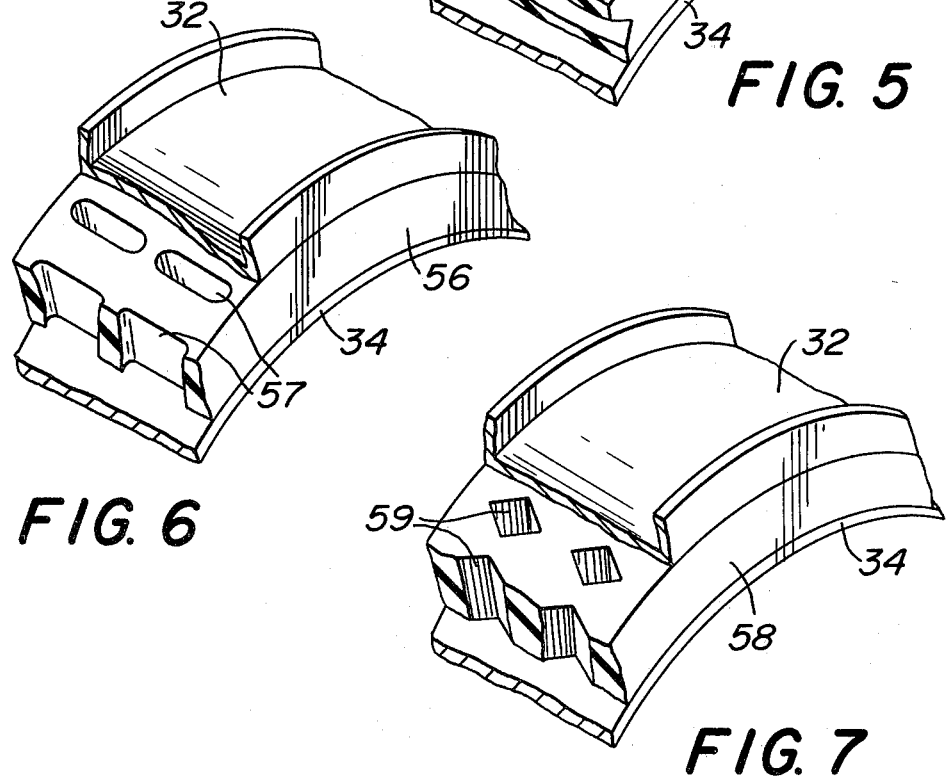

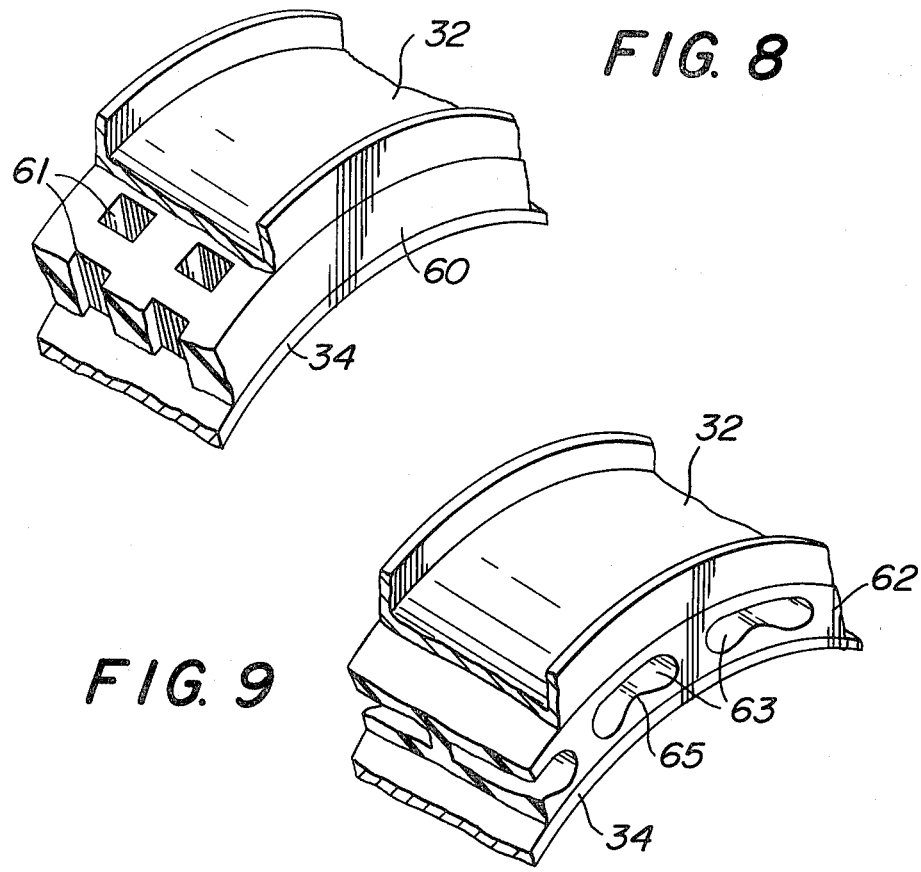
FIG. 8
FIG. 9
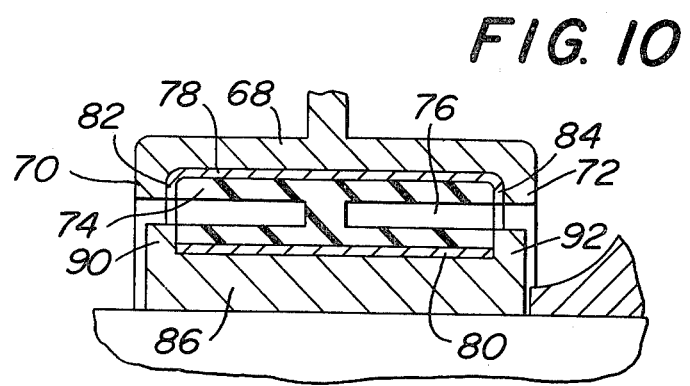
FIG. 10

PRIMARY SUSPENSION SYSTEM FOR A RAILWAY CAR

BACKGROUND OF THE INVENTION

In a railway car, primary and secondary suspension systems are generally employed. The primary suspension system generally refers to the suspension between the journal bearing assembly and the truck frame. The journal bearing assembly carries a wheel-axle unit and acceleration forces generated by the wheel are directed to the primary suspension system with some of the forces being transmitted through the primary suspension system to the side frame. The secondary system refers to the system between a bolster on the truck and the car body and generally includes air or mechanical springs. The present invention is directed to primary suspension systems.

An example of primary suspension system may be found in a copending patent application entitled "Primary Suspension System for a Railway Car", Ser. No. 62,772 filed Aug. 1, 1979, now U.S. Pat. No. 4,278,029, assigned to the same assignee as the present invention.

There are presently in use railway cars in which the primary suspension system includes a rubber so-called chock ring fitted between a journal bearing assembly and side frame of a truck. The rubber ring used is compressed and clamped between the journal assembly and side frame. The compressed ring causes very high vertical and longitudinal stiffnesses in the order of about 100,000 pounds per inch.

Relatively high vertical stiffness in the primary suspension systems results in very little attenuation of the wheel accelerations to the truck frame. The relatively high longitudinal stiffness tends to maintain the axle position or wheel base within the truck frame.

Tests have indicated that reducing the vertical stiffness in the primary suspension systems reduces the accelerations in the truck frame. This tends to increase the useful life of the truck mounted equipment.

Tests have also indicated that reducing the longitudinal stiffness in the primary suspension system permits the axles on the truck to assume a more radial position with respect to the tracks when making turns. This reduces the angle of attack of the wheel flanges with respect to the tracks thereby reducing lateral wheel forces. The result is reduction of wheel and flange wear and longer life.

OBJECTS OF THE INVENTION

It is an object of this invention to provide an improved primary suspension system in a railway truck.

It is a further object of this invention to provide an improved primary suspension system in which the vertical stiffness is reduced to reduce the accelerations on a truck frame during operation thereby increasing the life thereof.

It is still a further object of this invention to provide an improved primary suspension system in which the longitudinal stiffness is reduced to permit the axles on a truck to assume a more radial position with respect to curves in a track to reduce lateral wheel forces and reduce wheel wear.

It is still a further object of this invention to provide an improved relatively soft rubber primary suspension in which the creep in the rubber caused by operating stresses is minimized.

It is still a further object of this invention to provide an improved relatively soft rubber primary suspension system with high rubber creep resistance which may be readily substituted for systems in presently existing trucks.

BRIEF SUMMARY OF THE INVENTION

In accordance with the present invention, a primary suspension system is disposed between a journal bearing assembly and a side frame in a railway truck. The suspension system includes a rubber ring having voids or openings therein to provide softness. The rubber ring is securely bonded to upper and lower split metal rings to prevent creeping of the rubber during operation and permits the rubber ring to operate at higher stress levels. The upper ring is retained laterally by the side frame and the lower ring is retained laterally by the journal bearing assembly.

Other objects and advantages of the present invention will be apparent and suggest themselves to those skilled in the art from a reading of the following specification and claims, taken in conjunction with the accompanying drawings.

BRIEF DESCRIPTION OF THE DRAWINGS

FIG. 1 is a side view of a portion of a truck illustrating one embodiment of the present inventon;

FIG. 2 is a cross-sectional view taken along lines 2—2 of FIG. 1;

FIG. 3 is a cross-sectional view taken along lines 3—3 of FIG. 2;

FIGS. 4–10 are broken away partial views illustrating different forms of the primary suspension system of the present invention.

DESCRIPTION OF THE INVENTION

It is understood that the present invention may be used with a conventional railway truck. Such railway trucks generally include appropriate side frames for receiving wheel-axle assemblies. The truck is adapted to receive various types of equipment such as brakes, motors, gear boxes and the like. These conventional trucks also generally include suitable journal bearing assemblies for receiving the axles of the wheel axle units. The bearing journals are generally attached through primary suspension systems including rubber rings or the like to the side frames of the truck. Such a truck is illustrated in the aforementioned copending patent application. Because the details of such trucks are well known, they are not illustrated or described any further.

In FIG. 1, only a single wheel-axle assembly, journal bearing assembly and primary system are illustrated. It is apparent that in a conventional truck involving four wheel-axle assemblies that four primary suspension systems would be used.

A wheel 10 is secured to an axle 12. A journal bearing assembly 14 is disposed around the axle 12. The wheel-axle unit comprising the wheel 10 and axle 12 are secured to a side frame 16. The side frame 16 and other portions of the truck, not illustrated, may hold various other equipment, such as braking units and other similar apparatus 18, which are not related to the present invention and therefore will not be described in detail or referred to hereinafter. The primary suspension system 20, disposed between the journal bearing assembly 14 and the side frame 16, is the subject of the present invention and will be subsequently described in detail.

In general, the wheel-axle assembly is held to the side frame 16 by means of a clamp 22 adapted to be pivoted about a point 24. The clamp 22, after receiving the wheel-axle assembly is moved to a locked position and held secured to the frame by means of locking means 26 which may include a conventional head bolt, washer and lock nut.

Referring to FIGS. 2 and 3, along with FIG. 1, the primary suspension 20 comprises a flexible ring such as rubber 28 having a plurality of voids or cut-outs 30 therein. The rubber ring 28 is connected between an upper split ring 32 and a lower split ring 34. The rubber ring 28 is bonded, by epoxy or the like, to the inner surface of the outer ring 32 and to the outer surface of the inner ring 34.

The inner ring 34 is retained laterally by lip portions 36 and 38 extending outwardly from the main body of the bearing journal 14. The outer ring 32 includes lip portions 40 and 42 which extend outwardly to receive the frame 16 therebetween. Thus the journal bearing 14 maintains laterally the ring 34 and the side frame 16 maintains laterally the upper ring 32.

In order to position the bonded primary suspension 20 around the journal bearing 14, the outer ring 32 and the inner ring 34 are split so that each comprise two half segments. As illustrated in FIG. 3, the outer ring 32 includes segments 44 and 46 and the inner ring 34 comprises segments 48 and 50. The two half rings provide compliance for the machining of the mating parts.

The use of cut-outs or voids 30 in the rubber ring 28 reduces the total rubber area and increases the stresses and therefore the deflections under load. The cut-outs in the ring provide a lower spring rate in the vertical and longitudinal directions. In effect, a softer primary suspension system is provided than in many prior systems used heretofore.

Heretofore, the operating stresses in rubber have been limited by the creep of the rubber. In the present invention, the rubber ring is bonded to metal, such as steel plates, as in a sandwich. Because of this, the rubber ring in the primary suspension system may be operated at much higher stresses. Because of the bonding of the rubber ring to steel plates, it is possible to operate the rubber sandwich ring with higher stresses or larger strains for the same forces by reducing the work in an area of the rubber ring thus providing softer spring rates. The bonded sandwich design permits tailoring of the reduced area of the rubber with cut-outs. The cut-outs provide bulge areas for the rubber and thus produce a softer spring rate.

Because of the voids or cut-outs providing a softer spring and the bonding providing conditions preventing the bulging of the rubber areas of contact with the metal rings, the vertical stiffness of the primary suspension system described may be reduced to one-half or less over the current design where a compressed solid rubber ring is used. The longitudinal stiffness may be decreased to ¼ or less.

As previously mentioned, the relatively soft suspension system will reduce the accelerations produced by the wheel on the truck frame. This results in the equipment on the truck lasting much longer.

As also mentioned, the longitudinal stiffness is made lower to permit radial positioning of the truck with respect to the tracks during turns to thereby reduce the angle of attack of the wheel flanges with the tracks resulting in longer wear of the wheels.

In FIG. 3, the spaced openings 30 extend the rubber ring 28 in directions substantially parallel to the axis of the journal bearing assembly 14. The openings 30 may be elongated as illustrated. FIGS. 4 through 9 illustrate the same basic arrangement of a rubber ring with respect to the inner and outer rings, except for the configurations of the cut-outs or voids within the rubber ring 28.

All of FIGS. 4-9 include the outer ring 32 and the lower ring or inner ring 34. In FIG. 4, the rubber ring 52 includes a plurality of spaced openings 53 which are substantially square and extend through the ring 52 in directions parallel to the axis of the journal bearing assembly. In FIG. 5, the ring 54 includes spaced diamond openings 55 which extend in directions parallel to the journal bearing assembly. In FIG. 6, the rubber ring 56 includes a plurality of elongated spaced openings 57 which extend radially through the ring 56. In FIG. 7, the ring 58 includes a plurality of aligned diamond openings 59 extending radially through the ring 58. In FIG. 8, the ring 60 includes relatively square openings 61 extending radially through the ring 60. It is apparent that any number of openings in the rubber ring may be employed depending upon the particular design involved.

Referring to FIG. 9, the ring 62 includes a plurality of somewhat deformed elongated openings 63. These openings are somewhat like the openings 30 in FIG. 3 except that the ring 62 includes an upwardly extending rubber portion 65. The shapes of these openings make it possible to provide different spring rates within the rubber ring 62. For example, during operation, when the primary suspension system is loaded and the opening 63 tends to close, the portion of the rubber toward the top of the ring 62 will engage the extending portion 65 to vary the spring rate making it slightly stiffer. At the same time, there is still some void or open area in the total opening to permit a continuation of the relatively soft spring rate.

Referring to FIG. 10, a somewhat different side frame configuration is illustrated than that illustrated in FIGS. 1, 2 and 3. In FIG. 10, the side frame 68 includes downwardly extending lip portions 70 and 72. A rubber ring 74 includes cut-out portions 76 to provide the soft spring rate. The rubber ring 74 is securely bonded by epoxy or the like to a top ring 78 and a bottom or lower ring 80. The outer ring 78 includes downwardly extending lip portions 82 and 84. The top ring 78 is disposed to be retained between the lip portions 70 and 72 of the side frame 68. The lower ring 80 is retained between lip portions 90 and 92 of the journal bearing 86.

The embodiment of FIG. 10 is very similar to FIGS. 1, 2 and 3 except for the arrangement involving the direction of the lip portions of the upper ring and the side frame. The side frames of FIG. 10 have downwardly projecting portions 70 and 72 whereas the side frames of FIGS. 1, 2 and 3 do not include such projecting or lip portions thereby requiring the projecting portions to be put on the outer ring to retain the primary suspension system on the side frame.

There has thus been provided a relatively soft primary suspension system in which the journal bearing assemblies of the truck are substantially the same as that used in may prior systems. Thus retrofitting becomes a relatively easy matter. The providing of openings or voids in the rubber has provided a low desirable spring rate while the bonding of the rubber to the steel rings has made it possible for the rubber ring to withstand higher stresses in the same area.

What is claimed is:

1. In a railway truck having a side frame for receiving an axle disposed to ride on a journal bearing assembly, a primary suspension system disposed between said journal bearing assembly and said side frame comprising:
   (a) a first inner metal ring including two spaced segments;
   (b) a second outer metal ring including two spaced segments; p1 (c) an elastomeric ring comprising two segments, each of said segments being disposed between and bonded to one of said first and second metal ring segments to permit said elastomeric ring to withstand higher stresses in said primary suspension system and to minimize creep therein;
   (d) said elastomeric ring having a plurality of spaced cut-out portions therein and extending around said journal bearing assembly to provide a selected spring rate dependent on said cut-out portions;
   (e) said first inner metal ring being in engagement with said journal bearing assembly; and
   (f) said second outer ring being in engagement with said side frame,
   whereby relatively soft spring rates in vertical and longitudinal directions are provided.

2. A primary suspension system as set forth in claim 1 wherein each of said two segments of said inner and outer rings comprise approximately one-half the total ring circumference.

3. A primary suspension system as set forth in claim 2 wherein the inner surfaces of the two segments of said first inner ring are retained by said journal bearing.

4. A primary suspension system as set forth in claim 3 wherein the outer surfaces of the two segments of said second outer ring are retained laterally on said side frame.

5. A primary suspension system as set forth in claim 4 wherein said two segments of said second outer ring include outwardly extending lip portions along their outer edges to receive said side frame therebetween.

6. A primary suspension system as set forth in claim 5 wherein said cut-out portions in said elastomeric ring include lateral openings extending therethrough.

7. A primary suspension system as set forth in claim 6 wherein said lateral openings are disposed within the elastomer ring and shaped to provide different spring rates as the load on said primary suspension system increases, said different spring rates resulting from top portions of the elastomeric ring forming the opening contacting the bottom portions of the elastomeric ring while still maintaining open areas in the total areas of the openings until the compression forces applied to the elastomeric ring exceeds a predetermined level.

8. A primary suspension system as set forth in claim 5 wherein said cut-out portions in said elastomeric rings comprises radial openings extending therethrough.

9. A primary suspension system as set forth in claim 4 wherein said two segments of said second outer ring include inwardly extending lip portions along their outer edges to fit between inwardly projecting flanges on said side frame.

* * * * *

UNITED STATES PATENT OFFICE
CERTIFICATE OF CORRECTION

Patent No. 4,444,122  Dated April 24, 1984

Inventor(s) William W. Dickhart, III

It is certified that error appears in the above-identified patent and that said Letters Patent are hereby corrected as shown below:

Claim 1, line 9, cancel "pl".

Signed and Sealed this

Fourth Day of September 1984

|SEAL|

Attest:

GERALD J. MOSSINGHOFF

Attesting Officer  Commissioner of Patents and Trademarks